United States Patent
Zhou et al.

(10) Patent No.: US 12,309,072 B2
(45) Date of Patent: May 20, 2025

(54) NETWORK CONGESTION CONTROL METHOD AND NETWORK DEVICE

(71) Applicant: Huawei Technologies Co., Ltd., Shenzhen (CN)

(72) Inventors: Jun Zhou, Nanjing (CN); Nu Xia, Nanjing (CN); Xiaoyang Qu, Shenzhen (CN); Luyou He, Nanjing (CN); Xia Zhu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 227 days.

(21) Appl. No.: 17/993,346

(22) Filed: Nov. 23, 2022

(65) Prior Publication Data

US 2023/0090622 A1   Mar. 23, 2023

Related U.S. Application Data

(63) Continuation of application No. PCT/CN2021/095232, filed on May 21, 2021.

(30) Foreign Application Priority Data

May 26, 2020   (CN) .......................... 202010456643.2

(51) Int. Cl.
*G06F 15/173*   (2006.01)
*H04L 47/10*   (2022.01)
(Continued)

(52) U.S. Cl.
CPC .............. *H04L 47/27* (2013.01); *H04L 47/10* (2013.01); *H04L 47/127* (2013.01); *H04L 47/193* (2013.01); *H04L 47/30* (2013.01)

(58) Field of Classification Search
CPC ..... H04L 47/193; H04L 47/127; H04L 47/27; H04L 47/30
See application file for complete search history.

(56) References Cited

U.S. PATENT DOCUMENTS 8,379,515 B1 *   2/2013   Mukerji ................ H04L 69/163
                                                              370/229
2003/0147347 A1   8/2003   Chen et al.
(Continued)

FOREIGN PATENT DOCUMENTS

CN   107743057 A   2/2018
CN   107819853 A   3/2018
(Continued)

OTHER PUBLICATIONS

Ahmed M. Abdelmoniem et al., "Reconciling Mice and Elephants in Data Center Networks", 2015 IEEE 4th International Conference on Cloud Networking (CloudNet), IEEE, Oct. 5, 2015, XP032815744. 6 pages.

*Primary Examiner* — Joseph R Maniwang
(74) *Attorney, Agent, or Firm* — Slater Matsil, LLP (57) ABSTRACT

This application discloses a network congestion control method and a network device, and relates to the field of communication technologies, to improve continuity and completion of a packet in a transmission process of a Transmission Control Protocol (TCP) flow. In this application, when pre-congestion (that is, congestion may occur) occurs in a forwarding direction of the TCP flow, a forwarding device reduces a value of a receive window (RWND) field in an acknowledge (ACK) packet, to reduce a sending rate of a transmit end for a packet in the TCP flow or delay sending of a packet by a transmit end. This relieves buffer pressure of the forwarding device, reduces a packet loss, and improves the continuity and the completion of the packet in the transmission process of the TCP flow.

20 Claims, 6 Drawing Sheets

(51) Int. Cl.
*H04L 47/127* (2022.01)
*H04L 47/193* (2022.01)
*H04L 47/27* (2022.01)
*H04L 47/30* (2022.01)

(56) References Cited

U.S. PATENT DOCUMENTS

| | | |
|---|---|---|
| 2015/0188830 A1 | 7/2015 | Zhao |
| 2018/0091999 A1 | 3/2018 | Zhang et al. |
| 2018/0205656 A1* | 7/2018 | Atli .................. H04L 47/30 |

FOREIGN PATENT DOCUMENTS

| | | |
|---|---|---|
| CN | 108667739 A | 10/2018 |
| CN | 109412958 A | 3/2019 |
| CN | 110213167 A | 9/2019 |
| WO | 2012141718 A1 | 10/2012 |

* cited by examiner

NETWORK CONGESTION CONTROL METHOD AND NETWORK DEVICE

CROSS-REFERENCE TO RELATED APPLICATIONS

This application is a continuation of International Application No. PCT/CN2021/095232, filed on May 21, 2021, which claims priority to Chinese Patent Application No. 202010456643.2, filed on May 26, 2020. The disclosures of the aforementioned applications are hereby incorporated by reference in their entireties.

TECHNICAL FIELD

This application relates to the field of communication technologies, and in particular, to a network congestion control method and a network device.

BACKGROUND

Figure 1:
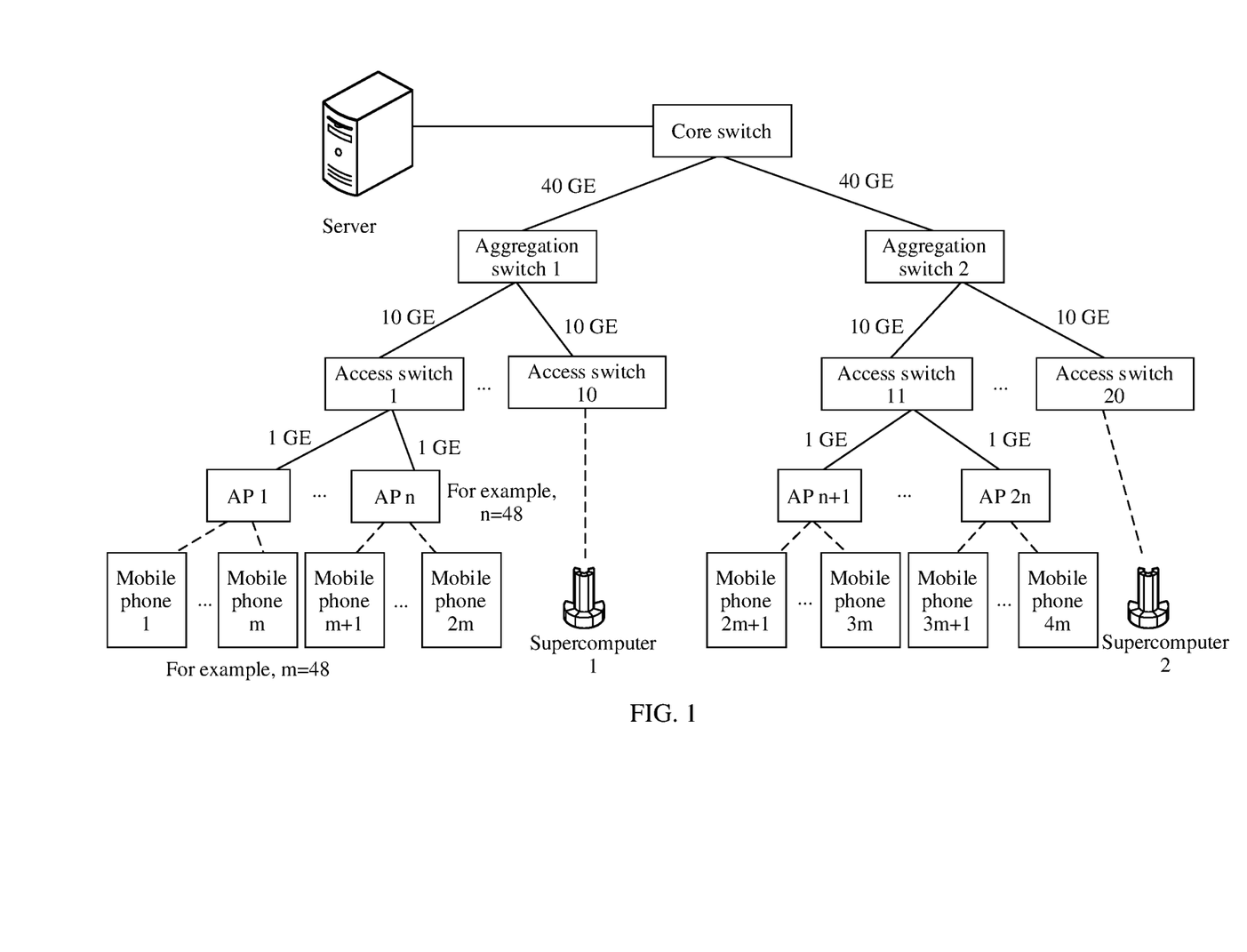
FIG. 1 is an architectural diagram of an enterprise campus network according to an embodiment of this application.

In a scenario of a multi-level switch, for example, a scenario of an enterprise campus network, network congestion may occur due to various reasons. An architecture of an enterprise campus network shown in FIG. 1 is used as an example. The enterprise campus network includes a plurality of access switches, a plurality of aggregation switches, and a plurality of core switches. It is assumed that, as shown in FIG. 1, a downlink port used by the core switch to send data to the aggregation switch is a 40 gigabit Ethernet (GE) port, a downlink port used by the aggregation switch to send data to the access switch is a 10 GE port, and a downlink port used by the access switch to send data to an AP is a 1 GE port. It is assumed that each core switch provides two 40 GE ports to connect to two aggregation switches, each aggregation switch provides 10 10 GE ports to connect to 10 access switches, and each access switch may provide 48 1 GE ports to connect to the access points (AP) or a terminal device (for example, a supercomputer). In this case, it may be determined that a ratio of transmission resource configurations of the access switch, the aggregation switch, and the core switch is (2×10×48 GE):(2×10×10 GE):(2×40 GE)=960:200:80.

Network congestion caused by, for example, mismatch of the transmission resource configurations of the access switch, the aggregation switch, and the core switch, or bursty of uplink data easily causes a many-to-one packet loss of the uplink data on a network device (for example, the access switch, the aggregation switch, or the core switch), affects continuity and completion of the data, and affects user experience.

SUMMARY

This application provides a network congestion control method and a network device, to improve continuity and completion of a packet in a transmission process of a TCP flow.

To achieve the foregoing objectives, the following technical solutions are used in this application.

According to a first aspect, a network congestion control method is provided. The method includes: When pre-congestion occurs, in a forwarding direction of a TCP flow, on a forwarding device that forwards the TCP flow, the forwarding device reduces a value of a receive window (RWND) field in an ACK packet of a packet in the TCP flow, where the ACK packet is reverse to the TCP flow.

According to the technical solution provided in the first aspect, when pre-congestion (that is, congestion may occur) occurs in the forwarding direction of the TCP flow, the forwarding device reduces the value of the RWND field in the acknowledge (ACK) packet, to control a sending rate of a transmit end for the packet in the TCP flow. This relieves buffer pressure of the forwarding device, reduces a packet loss, and improves continuity and completion of the packet in a transmission process of the TCP flow.

In a possible implementation, the method further includes: The forwarding device determines, based on a buffer status of the forwarding device, that pre-congestion occurs in the forwarding direction of the TCP flow. The buffer status of the forwarding device depends on one or more of the following: a quantity of packets buffered in the forwarding device, a data volume of the packets buffered in the forwarding device, and a ratio of the data volume of the packets buffered in the forwarding device to a buffer area. In this application, the forwarding device can determine, based on the buffer status of the forwarding device, whether pre-congestion occurs in the forwarding direction of the TCP flow, to trigger a mechanism of reducing the value of the RWND field.

In a possible implementation, that the forwarding device determines, based on a buffer status of the forwarding device, that pre-congestion occurs in the forwarding direction of the TCP flow includes: When one or more of the following are met, the forwarding device determines that pre-congestion occurs in the forwarding direction of the TCP flow: A quantity of packets buffered by the forwarding device in the forwarding direction of the TCP flow is greater than a preset quantity, a data volume of the packets buffered by the forwarding device in the forwarding direction of the TCP flow is greater than a preset data volume, and a ratio of the data volume of the packets buffered by the forwarding device in the forwarding direction of the TCP flow to the buffer area is greater than a preset ratio. In this application, the forwarding device can determine, based on one or more of the following, whether pre-congestion occurs in the forwarding direction of the TCP flow: the quantity of the packets buffered in the forwarding direction of the TCP flow, the data volume of the packets, and the ratio of the data volume of the packets to the buffer area, to trigger the mechanism of reducing the value of the RWND field.

In a possible implementation, that the forwarding device reduces a value of an RWND field in an ACK packet of a packet in the TCP flow includes: The forwarding device reduces the value of the RWND field in the ACK packet of the packet in the TCP flow based on one or more of the following: The quantity of the packets buffered by the forwarding device in the forwarding direction of the TCP flow, the data volume of the packets buffered by the forwarding device in the forwarding direction of the TCP flow, and the ratio of the data volume of the packets buffered by the forwarding device in the forwarding direction of the TCP flow to the buffer area. In this application, the forwarding device can calculate a reduced value of the RWND field based on the one or more of the quantity of the packets buffered in the forwarding direction of the TCP flow, the data volume of the packets, and the ratio of the data volume of the packets to the buffer area.

In a possible implementation, that the forwarding device reduces a value of an RWND field in an ACK packet of a packet in the TCP flow includes: The forwarding device reduces the value of the RWND field in the ACK packet of the packet in the TCP flow according to the following formula: $RWND = RWND' \times (1 - \alpha/2)$, where $\alpha = (1-g) \times \alpha' + g \times$ F, RWND' is a current value of the RWND field of the forwarding device, α' is a current adjustable parameter, g is an adjustable parameter, and F is the quantity of the packets buffered by the forwarding device in the forwarding direction of the TCP flow, the data volume of the packets, or the ratio of the data volume of the packets to the buffer area. In this application, the forwarding device can calculate the reduced value of the RWND field based on the quantity of the packets buffered in the forwarding direction of the TCP flow, the data volume of the packets, or the ratio of the data volume of the packets to the buffer area.

In a possible implementation, the forwarding direction includes an uplink direction and a downlink direction. The network congestion control method provided in this application is applicable to both a scenario of forwarding in the uplink direction and a scenario of forwarding in the downlink direction.

In a possible implementation, the forwarding device is a core switch, an aggregation switch, an access switch, or a wireless access point AP. The network congestion control method provided in this application is applicable to any network device in a TCP flow forwarding scenario, for example, the core switch, the aggregation switch, the access switch, or the wireless access point AP.

According to a second aspect, a forwarding device is provided. The forwarding device is configured to forward a TCP flow. The forwarding device includes: a processing unit, configured to reduce a value of a receive window RWND field in an acknowledge ACK packet of a packet in the TCP flow when pre-congestion occurs in a forwarding direction of the TCP flow, where the ACK packet is reverse to the TCP flow.

According to the technical solution provided in the second aspect, when pre-congestion (that is, congestion may occur) occurs in the forwarding direction of the TCP flow, the forwarding device reduces the value of the RWND field in the ACK packet, to control a sending rate of a transmit end for the packet in the TCP flow. This relieves buffer pressure of the forwarding device, reduces a packet loss, and improves continuity and completion of the packet in a transmission process of the TCP flow.

In a possible implementation, the forwarding device further includes a storage unit, configured to buffer the TCP flow. The processing unit is further configured to determine, based on a buffer status of the storage unit, that pre-congestion occurs in the forwarding direction of the TCP flow. The buffer status of the storage unit depends on one or more of the following: a quantity of packets buffered in the storage unit, a data volume of the packets buffered in the storage unit, and a ratio of the data volume of the packets buffered in the storage unit to a buffer area. In this application, the forwarding device can determine, based on the buffer status of the memory, whether pre-congestion occurs in the forwarding direction of the TCP flow, to trigger a mechanism of reducing the value of the RWND field.

In a possible implementation, that the processing unit determines, based on a buffer status of the storage unit, that pre-congestion occurs in the forwarding direction of the TCP flow specifically includes: When one or more of the following are met, the processing unit determines that pre-congestion occurs in the forwarding direction of the TCP flow: A quantity of packets buffered by the storage unit in the forwarding direction of the TCP flow is greater than a preset quantity, a data volume of the packets buffered by the storage unit in the forwarding direction of the TCP flow is greater than a preset data volume, and a ratio of the data volume of the packets buffered by the storage unit in the forwarding direction of the TCP flow to the buffer area is greater than a preset ratio. In this application, the forwarding device can determine, based on one or more of the following, whether pre-congestion occurs in the forwarding direction of the TCP flow: the quantity of the packets buffered in the forwarding direction of the TCP flow, the data volume of the packets, and the ratio of the data volume of the packets to the buffer area, to trigger the mechanism of reducing the value of the RWND field.

In a possible implementation, that the processing unit reduces a value of an RWND field in an ACK packet of a packet in the TCP flow includes: The processing unit reduces the value of the RWND field in the ACK packet of the packet in the TCP flow based on one or more of the following: the quantity of the packets buffered by the storage unit in the forwarding direction of the TCP flow, the data volume of the packets buffered by the storage unit in the forwarding direction of the TCP flow, and the ratio of the data volume of the packets buffered by the storage unit in the forwarding direction of the TCP flow to the buffer area. In this application, the forwarding device can calculate a reduced value of the RWND field based on the one or more of the quantity of the packets buffered in the forwarding direction of the TCP flow, the data volume of the packets, and the ratio of the data volume of the packets to the buffer area.

In a possible implementation, that the processing unit reduces a value of an RWND field in an ACK packet of a packet in the TCP flow includes: The processing unit reduces the value of the RWND field in the ACK packet of the packet in the TCP flow according to the following formula: $RWND=RWND'\times(1-\alpha/2)$, where $\alpha=(1-g)\times\alpha'+g\times F$, RWND' is a current value of the RWND field of the forwarding device, α' is a current adjustable parameter, g is an adjustable parameter, and F is the quantity of the packets buffered by the storage unit in the forwarding direction of the TCP flow, the data volume of the packets, or the ratio of the data volume of the packets to the buffer area. In this application, the forwarding device can calculate the reduced value of the RWND field based on the quantity of the packets buffered in the forwarding direction of the TCP flow, the data volume of the packets, or the ratio of the data volume of the packets to the buffer area.

In a possible implementation, the forwarding direction includes an uplink direction and a downlink direction. The network congestion control method provided in this application is applicable to both a scenario of forwarding in the uplink direction and a scenario of forwarding in the downlink direction.

In a possible implementation, the forwarding device is a core switch, an aggregation switch, an access switch, or a wireless access point AP. The network congestion control method provided in this application is applicable to any network device in a TCP flow forwarding scenario, for example, the core switch, the aggregation switch, the access switch, or the wireless access point AP.

According to a third aspect, a forwarding device is provided. The forwarding device is configured to forward a TCP flow. The forwarding device includes: a memory, configured to store a computer program and the TCP flow; a transceiver, configured to receive or send a radio signal; and a processor, configured to execute the computer program, to enable the forwarding device to reduce a value of a receive window RWND field in an acknowledge ACK packet of a packet in the TCP flow when pre-congestion occurs in a forwarding direction of the TCP flow. The ACK packet is reverse to the TCP flow.

According to the technical solution provided in the third aspect, when pre-congestion (that is, congestion may occur) occurs in the forwarding direction of the TCP flow, the forwarding device reduces the value of the RWND field in the ACK packet, to control a sending rate of a transmit end for the packet in the TCP flow. This relieves buffer pressure of the forwarding device, reduces a packet loss, and improves continuity and completion of the packet in a transmission process of the TCP flow.

In a possible implementation, the processor is further configured to execute the computer program, to enable the forwarding device to determine, based on a buffer status of the memory, that pre-congestion occurs in the forwarding direction of the TCP flow. The buffer status of the memory depends on one or more of the following: a quantity of packets buffered in the memory, a data volume of the packets buffered in the memory, and a ratio of the data volume of the packets buffered in the memory to a buffer area. In this application, the forwarding device can determine, based on the buffer status of the memory, whether pre-congestion occurs in the forwarding direction of the TCP flow, to trigger a mechanism of reducing the value of the RWND field.

In a possible implementation, the processor is specifically configured to execute the computer program, to enable the forwarding device to determine, when one or more of the following are met, that pre-congestion occurs in the forwarding direction of the TCP flow: A quantity of packets buffered by the memory in the forwarding direction of the TCP flow is greater than a preset quantity, a data volume of the packets buffered by the memory in the forwarding direction of the TCP flow is greater than a preset data volume, and a ratio of the data volume of the packets buffered by the memory in the forwarding direction of the TCP flow to the buffer area is greater than a preset ratio. In this application, the forwarding device can determine, based on one or more of the following, whether pre-congestion occurs in the forwarding direction of the TCP flow: the quantity of the packets buffered in the forwarding direction of the TCP flow, the data volume of the packets, and the ratio of the data volume of the packets to the buffer area, to trigger the mechanism of reducing the value of the RWND field.

In a possible implementation, that the processor reduces a value of an RWND field in an ACK packet of a packet in the TCP flow includes: The processor reduces the value of the RWND field in the ACK packet of the packet in the TCP flow based on one or more of the following: the quantity of the packets buffered by the memory in the forwarding direction of the TCP flow, the data volume of the packets buffered by the memory in the forwarding direction of the TCP flow, and the ratio of the data volume of the packets buffered by the memory in the forwarding direction of the TCP flow to the buffer area, to reduce the value of the RWND field in the ACK packet of the packet in the TCP flow. In this application, the forwarding device can calculate a reduced value of the RWND field based on the one or more of the quantity of the packets buffered in the forwarding direction of the TCP flow, the data volume of the packets, and the ratio of the data volume of the packets to the buffer area.

In a possible implementation, that the processor executes the computer program, to enable the forwarding device to reduce a value of an RWND field in an ACK packet of a packet in the TCP flow includes: The processor executes the computer program, to enable the forwarding device to reduce the value of the RWND field in the ACK packet of the packet in the TCP flow according to the following formula: $RWND=RWND' \times (1-\alpha/2)$, where $\alpha=(1-g) \times \alpha' + g \times F$, $RWND'$ is a current value of the RWND field of the forwarding device, $\alpha'$ is a current adjustable parameter, g is an adjustable parameter, and F is the quantity of the packets buffered by the memory in the forwarding direction of the TCP flow, the data volume of the packets, or the ratio of the data volume of the packets to the buffer area. In this application, the forwarding device can calculate the reduced value of the RWND field based on the quantity of the packets buffered in the forwarding direction of the TCP flow, the data volume of the packets, or the ratio of the data volume of the packets to the buffer area.

In a possible implementation, the forwarding direction includes an uplink direction and a downlink direction. The network congestion control method provided in this application is applicable to both a scenario of forwarding in the uplink direction and a scenario of forwarding in the downlink direction.

In a possible implementation, the forwarding device is a core switch, an aggregation switch, an access switch, or a wireless access point AP. The network congestion control method provided in this application is applicable to any network device in a TCP flow forwarding scenario, for example, the core switch, the aggregation switch, the access switch, or the wireless access point AP.

According to a fourth aspect, a computer-readable storage medium is provided. The computer-readable storage medium stores computer program code, and when the computer program code is executed by a processor, the method according to any possible implementation of the first aspect is implemented.

According to a fifth aspect, a chip system is provided. The chip system includes a processor and a memory, the memory stores computer program code, and when the computer program code is executed by the processor, the method according to any possible implementation of the first aspect is implemented. The chip system may include a chip, or may include a chip and another discrete component.

According to a sixth aspect, a computer program product is provided. When the computer program product runs on a computer, the method according to any possible implementation of the first aspect is implemented.

DETAILED DESCRIPTION OF ILLUSTRATIVE EMBODIMENTS

Embodiments of this application provide a network congestion control method, which may be applied to a communication system based on the Transmission Control Protocol (TCP).

For example, the network congestion control method provided in embodiments of this application is applicable to the following communication systems based on the TCP protocol: an Internet of Things (IoT) system, a wireless local area network (WLAN) system, a Long Term Evolution (LTE) system, a 5th generation mobile communication (5th generation mobile network or 5th generation wireless system, 5G) new radio (NR) system, or a communication system after 5G, for example, a 6G system, a device to device (D2D) communication system, or an Internet of Vehicles. This is not limited in this application.

A specific application scenario of the network congestion control method is not limited in this application. For example, the network congestion control method provided embodiments of this application may be applied to a scenario of an enterprise campus network shown in FIG. 1 or a scenario of a data center network.

For example, in a scenario of an enterprise campus network of the IoT system, a huge network is formed by combining various information sensing devices, such as a radio frequency identification apparatus, an infrared sensor, a global positioning system, and a laser scanner, with the Internet. A purpose is to connect all objects to the network, to facilitate identification and management. For example, data collected by a surveillance camera needs to be uploaded to a server by using a wireless AP and a switch. The data is summarized, analyzed, and managed in a unified manner on a server side. Usually, the enterprise campus network is layered. For example, the enterprise campus network may be divided into an access layer, an aggregation layer, and a core layer. Each layer corresponds to an access switch, an aggregation switch, and a core switch.

The AP is mainly used as an access point for a device, for example, a mobile terminal (for example, a mobile phone), to access a wired network. The AP may be used in a broadband home, building, and campus. The AP may cover tens of meters to hundreds of meters. The access switch is mainly used to connect a terminal device to the network. A part that is directly oriented to a user connection or network access and that is of the network is referred to as the access layer. The access switch is generally directly connected to the terminal device, for example, a computer. Therefore, the access switch usually has low costs and high port density. The aggregation switch is an aggregation point of a plurality of access switches, can process all traffic from an access-layer device (for example, the access switch), and can provide an uplink to a core-layer device (for example, the core switch). Therefore, compared with an access-layer switch, an aggregation-layer switch usually has higher performance, fewer interfaces, and a higher switching rate. On the enterprise campus network, the aggregation switch is generally deployed between buildings and functions as a local or important transit station. The core switch is mainly used to provide high-speed transmission and optimization for an aggregation-layer device (for example, the aggregation switch), and is equivalent to an egress or a general aggregation. The core switch bears and aggregates all transmission traffic. Therefore, the core switch usually has high reliability and a high throughput. For example, a Layer 2 or Layer 3 switch with a high throughput may be used as the core switch. The server includes a server cluster inside an enterprise campus, for example, a self-built data center (DC), an equipment room, or a private cloud in the enterprise campus. The server is configured to provide a remote service (for example, a computing service, a storage service, or a network service) for the terminal device. The DC or the private cloud is a data center or equipment room built on the enterprise campus network to provide the remote service. The DC or the private cloud is a dedicated cloud deployment mode that is controlled by a cloud service customer and that is used for a single cloud service user and resources. The DC or private cloud may be owned, managed, and operated by an enterprise or a third party, and may be deployed in an enterprise workplace. The private cloud may be deployed in the DC. In embodiments of this application, a transmit end for an uplink TCP flow is the terminal device, and a final receive end may be disposed in the server (for example, the DC or the private cloud).

In this application, the terminal device may be a desktop device, a laptop device, a handheld device, a wearable device, a smart home device, a computing device, a vehicle-mounted device, or the like with a wired or wireless connection function, for example, a netbook, a tablet computer, a smartwatch, a supercomputer, an ultra-mobile personal computer (UMPC), a smart camera, a netbook, a personal digital assistant (PDA), a portable multimedia player (PMP), an augmented reality (AR)/virtual reality (VR) device, a wireless device on aircraft, a wireless device on a robot, a wireless device in industrial control, a wireless device in telemedicine, a wireless device in a smart grid, or a wireless device in a smart city. Alternatively, UE may be a wireless device in a narrow band (NB) technology, or the like. In addition, in this application, the terminal device may alternatively be a terminal device in the IoT system, for example, a sensor or a camera. Alternatively, the terminal device may be an industrial manufacturing automatic optical inspection (AOI) device or the like. A specific type, a structure, and the like of the terminal device are not limited in this application.

It should be noted that a network architecture of the enterprise campus network is not limited in this application. In other words, the enterprise campus network is not limited to the network devices shown in FIG. 1, and may further include a network device with another function. For example, the enterprise campus network may further include a campus network controller, an egress router, an operator network, a private network, a public cloud, or the like.

The campus network controller is configured to manage the network devices (for example, the core switch, the aggregation switch, the access switch, and the AP shown in FIG. 1) in the campus. For example, the campus network controller may be a software defined network (SDN) controller, and the SDN controller is configured to be responsible for traffic control, to ensure an intelligent network, and the like. The egress router is configured to provide a Layer 3 interface service for accessing a wide area network, provide a packet forwarding function of a local area network or the wide area network, and the like. The public cloud is a cloud deployment mode that is controlled by a cloud service provider and that is used for a cloud service user and resources. The cloud service provider builds an infrastructure, integrates the resources to build a cloud virtual resource pool, and allocates the resources to a plurality of tenants as required. For example, the public cloud may include a cloud server, a cloud server instance, or the like.

In the network congestion control method provided in embodiments of this application, a transmit end sends a service-based TCP flow to a receive end. The service may include but is not limited to a video service, a voice service, or the like. Each TCP flow includes one or more packets. Each TCP flow may correspond to one service, or may correspond to one user, or the like. This is not limited in this application. When receiving the TCP flow, a forwarding device buffers the packet in the TCP flow in a buffer area. When congestion may occur in a forwarding direction of the TCP flow, the forwarding device reduces a value of a receive window (RWND) field in an acknowledge (ACK) packet, to control a sending rate of the transmit end for the packet in the TCP flow. This relieves buffer pressure of the forwarding device, reduces a packet loss, and improves continuity and completion of the packet in a transmission process of the TCP flow. For example, when congestion may occur in a forwarding direction of the uplink TCP flow, the forwarding device reduces a value of an RWND field in a downlink ACK packet, to control a sending rate of the terminal device. When congestion may occur in a forwarding direction of a downlink TCP flow, the forwarding device reduces a value of an RWND field in an uplink ACK packet, to control a sending rate of the server (for example, the DC or the private cloud).

In the TCP/Internet Protocol (IP), in a transmission process of a TCP packet, if a receive end for the TCP packet successfully receives the packet, the receive end responds with an ACK packet to a transmit end for the TCP packet, to acknowledge, to the transmit end for the TCP packet, that the corresponding TCP packet has been received. When a sender of the TCP packet receives the ACK packet, the sender may send a next packet. If the transmit end for the TCP packet does not receive the ACK packet, the transmit end for the TCP packet may retransmit the current packet or stop sending a packet. An actual situation depends on a used network protocol. Usually, the ACK packet has a fixed format and length. The packet format and the length of the ACK packet are not particularly limited in this embodiment of this application, provided that the packet format and the length of the ACK packet comply with a transmission protocol. For specific descriptions of the ACK packet, refer to explanations and descriptions in the conventional technology. Details are not described herein again.

In this embodiment of this application, a forwarding direction of the ACK packet is reserve to the forwarding direction of the TCP flow. The architecture of the enterprise campus network shown in FIG. 1 is used as an example. If the forwarding device is the core switch and the forwarding direction of the TCP flow is an uplink, the ACK packet is a downlink ACK packet. In this case, the ACK packet is forwarded by the core switch to an aggregation switch 1 and/or an aggregation switch 2. If the forwarding device is an aggregation switch 1 and the forwarding direction of the TCP flow is an uplink, the ACK packet is a downlink ACK packet. In this case, the ACK packet is forwarded by the aggregation switch 1 to at least one of an access switch 1 to an access switch 10. If the forwarding device is an access switch 1 and the forwarding direction of the TCP flow is an uplink, the ACK packet is a downlink ACK packet. In this case, the ACK packet is forwarded by the access switch 1 to at least one of a wireless access point (access point, AP) 1 to a wireless AP n (where n is a positive integer). If the forwarding device is an access switch 10 and the forwarding direction of the TCP flow is an uplink, the ACK packet is a downlink ACK packet. In this case, the ACK packet is forwarded by the access switch 10 to a supercomputer 1. If the forwarding device is a wireless AP 1 and the forwarding direction of the TCP flow is an uplink, the ACK packet is a downlink ACK packet. In this case, the ACK packet is forwarded by the AP 1 to at least one of a mobile phone 1 to a mobile phone m (where m is a positive integer). When the forwarding direction of the TCP flow is the uplink, a transmit end for the TCP flow is usually a terminal device, for example, a mobile phone (for example, a mobile phone 1 to a mobile phone 4*m*) or a supercomputer (for example, the supercomputer 1 or a supercomputer 2) shown in FIG. 1.

If the forwarding device is a wireless AP 1 and the forwarding direction of the TCP flow is a downlink, the ACK packet is an uplink ACK packet. In this case, the ACK packet is forwarded by the AP 1 to an access switch 1. If the forwarding device is an access switch 1 and the forwarding direction of the TCP flow is a downlink, the ACK packet is an uplink ACK packet. In this case, the ACK packet is forwarded by the access switch 1 to an aggregation switch 1. If the forwarding device is an aggregation switch 1 and the forwarding direction of the TCP flow is a downlink, the ACK packet is an uplink ACK packet. In this case, the ACK packet is forwarded by the aggregation switch 1 to the core switch. When the forwarding direction of the TCP flow is the downlink, the transmit end for the TCP flow is usually a network device, for example, the core switch shown in FIG. 1.

As shown above, the forwarding device in this application may be the core switch, the aggregation switch, the access switch, or the AP shown in FIG. 1. However, a specific function and a structure of the forwarding device are not limited in this application. For example, the forwarding device may be alternatively the campus network controller in the architecture of the enterprise campus network. The forwarding device may be alternatively a device in another TCP transmission scenario. The device is capable of forwarding the TCP packet.

Figure 2:
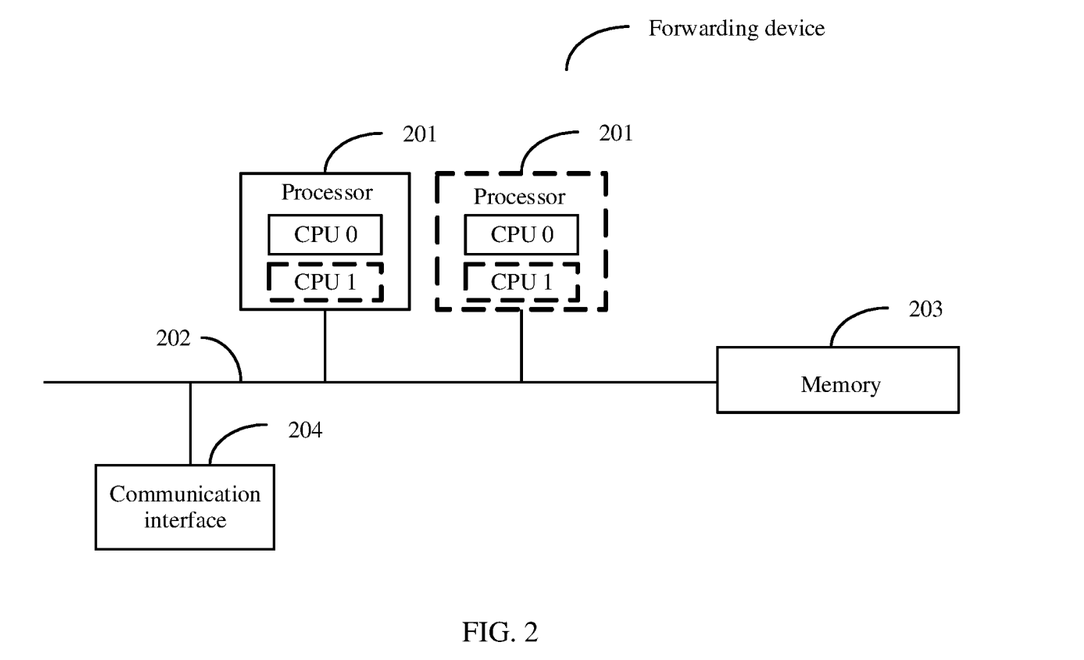
FIG. 2 is a schematic diagram of a hardware structure of a forwarding device according to an embodiment of this application.

FIG. 2 is a schematic diagram of a hardware structure of a forwarding device according to an embodiment of this application. As shown in FIG. 2, the forwarding device may include a processor 201, a communication line 202, a memory 203, and at least one communication interface (where FIG. 2 is merely an example in which a communication interface 204 is included for description).

The processor 201 may be a general-purpose central processing unit (CPU), a microprocessor, an application-specific integrated circuit (ASIC), or one or more integrated circuits configured to control execution of programs in the solutions in this application.

The communication line 202 may include a path for transmitting information between the foregoing components.

The communication interface 204 is configured to communicate with another device or communication network by using any transceiver-type apparatus, for example, communicate with an AP, an access switch, an aggregation switch, a core switch, or a network controller.

The memory 203 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction structure or a data structure and that can be accessed by a computer, but is not limited thereto. The memory may exist independently, and is connected to the processor through the communication line 402. The memory may be alternatively integrated with the processor.

The memory 203 is configured to store computer-executable instructions for performing the solutions in this application. The memory 203 may store instructions for implementing a modular function, for example, a sending instruction, a receiving instruction, or a processing instruction, and the processor 201 controls execution of the instructions. The processor 201 is configured to execute the computer-executable instructions stored in the memory 203, to implement a method provided in the following embodiments of this application. FIG. 2 is merely a schematic diagram of the memory 203, and the memory may further include another functional instruction. This is not limited in the present invention.

Optionally, the computer-executable instructions in this application may also be referred to as application program code. This is not specifically limited in this application.

During specific implementation, in an embodiment, the processor 201 may include one or more CPUs, for example, a CPU 0 and a CPU 1 in FIG. 2.

It should be noted that hardware modules included in the forwarding device shown in FIG. 2 are merely described as examples, and do not limit a specific structure of the forwarding device. For example, the forwarding device may further include another function module.

Figure 3:
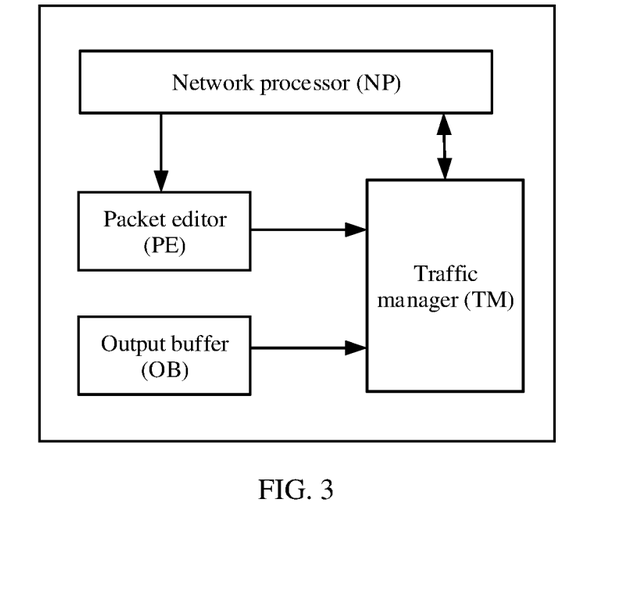
FIG. 3 is a schematic diagram of a function module of a forwarding device according to an embodiment of this application.

In a possible structure, as shown in FIG. 3, the processor 201 may include a network processor (NP), a traffic manager (TM), and a packet editor (PE). The memory 203 may include an output buffer (OB).

The OB may be configured to buffer a received TCP flow.

The TM may be configured to obtain queue and port throughput information from the OB, and provide the queue and port throughput information to the NP. The TM may also be configured to receive an explicit congestion notification (ECN) enabling notification from the PE, read information about a threshold register, and modify an ECN field of a packet based on a threshold and length of queue buffer.

The NP may be configured to send an ECN enabling instruction to the PE. The NP may be further configured to read information from a register of the TM, and calculate the threshold based on read information such as the queue buffer and a throughput. A value of the threshold register of the TM is modified. A congestion window (CWND) is calculated based on a queue congestion status.

The network congestion control method provided in this application may be applied to a forwarding device having a structure in FIG. 2 or a similar structure. Alternatively, the method may be applied to a forwarding device having another structure. This is not limited in this application.

The following further describes in detail a network congestion control method provided in an embodiment of this application.

Figure 4:
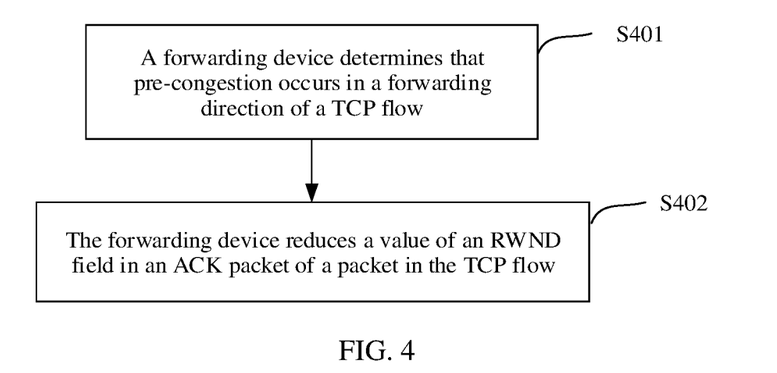
FIG. 4 is a schematic flowchart of a network congestion control method according to an embodiment of this application.

FIG. 4 is a schematic flowchart of a network congestion control method according to an embodiment of this application. The method is performed by a forwarding device. The forwarding device is configured to forward a TCP flow. For example, the forwarding device may be the AP, the access switch, the aggregation switch, or the core switch shown in FIG. 1. As shown in FIG. 4, the network congestion control method may include the following Steps S401 and S402.

S401: The forwarding device determines that pre-congestion occurs in a forwarding direction of the TCP flow.

The forwarding direction of the TCP flow includes an uplink direction and a downlink direction.

The architecture of the campus network shown in FIG. 1 is used as an example. The uplink forwarding direction of the TCP flow may be a direction from the mobile phone (for example, the mobile phone 1 to the mobile phone 4m) to the server in FIG. 1, or a direction from the supercomputer (for example, the supercomputer 1 or the supercomputer 2) to the server in FIG. 1. More specifically, the uplink forwarding direction of the TCP flow is a direction from the mobile phone, the AP, the access switch, the aggregation switch, and the core switch to the server in FIG. 1, or a direction from the supercomputer, the access switch, the aggregation switch, and the core switch to the server in FIG. 1. The downlink forwarding direction of the TCP flow may be a direction from the server to the mobile phone (for example, the mobile phone 1 to the mobile phone 4m) in FIG. 1, or a direction from the server to the supercomputer (for example, the supercomputer 1 or the supercomputer 2) in FIG. 1. More specifically, the downlink forwarding direction of the TCP flow is a direction from the server, the core switch, the aggregation switch, the access switch, and the AP to the mobile phone in FIG. 1, or a direction from the server, the core switch, the aggregation switch, and the access switch to the supercomputer in FIG. 1.

In some embodiments, Step S401 may specifically include: The forwarding device determines, based on a buffer status of the forwarding device, that pre-congestion occurs in the forwarding direction of the TCP flow. The buffer status of the forwarding device is used to represent at least a quantity of packets buffered in the forwarding device and a ratio of a data volume of the packets buffered in the forwarding device to a buffer area. For example, the buffer status of the forwarding device depends on one or more of the following: the quantity of the packets buffered in the forwarding device, the data volume of the packets buffered in the forwarding device, and the ratio of the data volume of the packets buffered in the forwarding device to the buffer area. For example, if a quantity of packets buffered by the forwarding device in a buffer area is greater than a preset quantity, the forwarding device determines that pre-congestion occurs in a forwarding direction of a TCP flow that is forwarded through the buffer area. For another example, if a ratio of a data volume of packets buffered by the forwarding device in a buffer area to the buffer area is greater than a preset ratio, the forwarding device determines that pre-congestion occurs in a forwarding direction of a TCP flow that is forwarded through the buffer area.

In this embodiment of this application, if the forwarding device determines that both a TCP packet and a User Datagram Protocol (UDP) packet or a packet based on another protocol (for example, a Network Group Management Protocol (Internet Group Management Protocol, IGMP) packet, a Network Control Message Protocol (Internet Control Message Protocol, ICMP) packet, an open shortest path first (OSPF) packet, or a Border Gateway Protocol (BGP) packet) are buffered in the forwarding direction of the TCP flow, the forwarding device may determine, based on a total quantity of the packets buffered in the forwarding device or a total data volume of the packets buffered in the forwarding device, whether pre-congestion occurs in the forwarding direction of the TCP flow.

The foregoing preset quantity or the preset ratio may be manually set, or may be calculated by the forwarding device based on a current throughput in the forwarding direction of the TCP flow and the quantity/the data volume of the packets buffered in the buffer area. For example, the preset quantity may be 100, the preset data volume may be boo kilobytes (kbytes), and the preset ratio may be 75%.

It may be understood that the buffer status of the forwarding device may be reflected by the quantity of the packets buffered in the forwarding direction of the TCP flow, the ratio of the data volume of the packets buffered in the forwarding device to the buffer area, and the like. For example, a larger quantity of the buffered packets, a larger data volume of the buffered packets, or a higher ratio of the data volume of the buffered packets to the buffer area may indicate a smaller remaining buffer area in the buffer area of the forwarding device, and indicate higher likelihood of congestion. Congestion means that, when a remaining buffer area in the buffer area is less than a preset value (for example, when the buffer area is fully occupied), the buffer area discards a packet, to relieve buffer pressure of the buffer area. The packet discarded by the buffer area may be a previously buffered packet or a newly incoming packet. Therefore, a smaller remaining buffer area in the buffer area of the forwarding device indicates a higher probability of a packet loss. A state close to congestion is referred to as pre-congestion. In this case, the forwarding device may change a value of an RWND field in an ACK packet when pre-congestion occurs in the forwarding direction of the TCP flow. This relieves buffer pressure of the forwarding device and prevents a packet loss (which includes an uplink packet loss and a downlink packet loss) caused by congestion.

S402: The forwarding device reduces the value of the RWND field in the ACK packet of a packet in the TCP flow.

The value of the RWND field in the ACK packet is used to represent a quantity or a data volume of packets that can be received by a receive end for the TCP flow. A larger value of the RWND field indicates a higher sending rate at which a transmit end for the TCP flow may send a TCP packet to the receive end. A smaller value of the RWND field indicates a lower sending rate at which the transmit end for the TCP flow needs to send the TCP packet to the receive end.

In this application, the forwarding device may determine a value of a new RWND field, namely, a reduced value of the RWND field in the ACK packet, based on the buffer status of the forwarding device. Specifically, the forwarding device determines, when one or more of the following are met, that pre-congestion occurs in the forwarding direction of the TCP flow: A quantity of packets buffered by the forwarding device in the forwarding direction of the TCP flow is greater than a preset quantity, a data volume of the packets buffered by the forwarding device in the forwarding direction of the TCP flow is greater than a preset data volume, and a ratio of the data volume of the packets buffered by the forwarding device in the forwarding direction of the TCP flow to the buffer area is greater than a preset ratio.

For example, it is assumed that RWND' is a current value of the RWND field of the forwarding device. The forwarding device may reduce the value of the RWND field in the ACK packet of the packet in the TCP flow according to the following formula: RWND=RWND'×(1−α/2), where α=(1−g)×α'+g×F, α' is a current adjustable parameter, g is an adjustable parameter, and F is the quantity of the packets buffered by the forwarding device in the forwarding direction of the TCP flow, the data volume of the buffered packet, or the ratio of the data volume of the buffered packet to the buffer area.

Alternatively, the forwarding device may obtain the value of the RWND field based on the foregoing parameter F by using another calculation formula.

Alternatively, the forwarding device may obtain the reduced value of the RWND field in the ACK packet through calculation by using another calculation principle or method. For details, refer to a processing method in the conventional technology. A specific method for determining the reduced value of the RWND field in the ACK packet by the forwarding device is not limited in this embodiment of this application.

Figure 5:
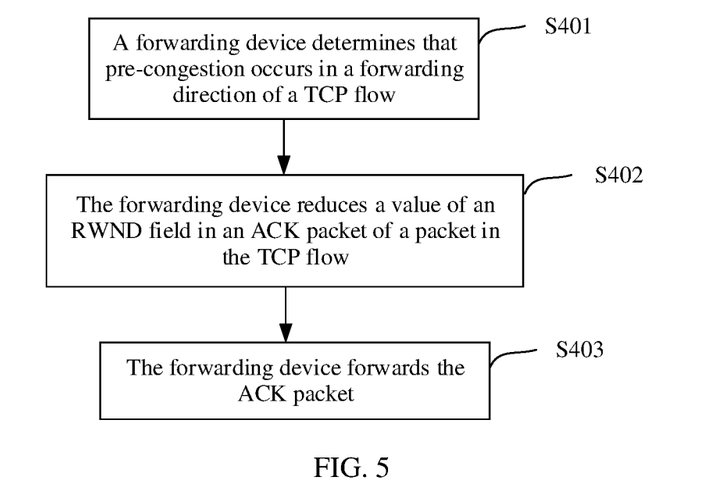
FIG. 5 is a schematic flowchart of another network congestion control method according to an embodiment of this application.

Further, as shown in FIG. 5, the network congestion control method provided in this embodiment of this application may further include the following Step S403.

S403: The forwarding device forwards the ACK packet.

The ACK packet (which includes a downlink ACK packet or an uplink ACK packet) includes the RWND field. The ACK packet is used to notify the transmit end for the packet in the TCP flow that the receive end has received a corresponding packet. Further, the ACK packet is used to notify the transmit end for the packet that the transmit end for the packet adjusts a sending rate based on the value of the RWND field in the ACK packet, to relieve the buffer pressure of the forwarding device, so as to reduce the packet loss (which includes the uplink packet loss and the downlink packet loss). Adjusting the sending rate includes increasing the sending rate or decreasing the sending rate. Specifically, the transmit end for the TCP packet may adjust the sending rate by adjusting a send window of the TCP packet. The send window refers to a quantity or a data volume of packets that are continuously written to a network at a time in a sending direction.

In this application, the foregoing ACK packet is reverse to the TCP flow. If the forwarding direction of the TCP flow is an uplink, the ACK packet is a downlink ACK packet. If the forwarding direction of the TCP flow is a downlink, the ACK packet is an uplink ACK packet.

The architecture of the campus network shown in FIG. 1 is used as an example. If the forwarding direction of the TCP flow is a direction from the mobile phone (for example, the mobile phone 1 to the mobile phone 4*m*) or the supercomputer (for example, the supercomputer 1 or the supercomputer 2) to the server in FIG. 1, the ACK packet is sent by the server to the mobile phone (for example, the mobile phone 1 to the mobile phone 4*m*) or the supercomputer (for example, the supercomputer 1 or the supercomputer 2). If the forwarding direction of the TCP flow is a direction from the server to the mobile phone (for example, the mobile phone 1 to the mobile phone 4*m*) or the supercomputer (for example, the supercomputer 1 or the supercomputer 2) in FIG. 1, the ACK packet is sent by the access switch/AP to the server.

Figure 6:
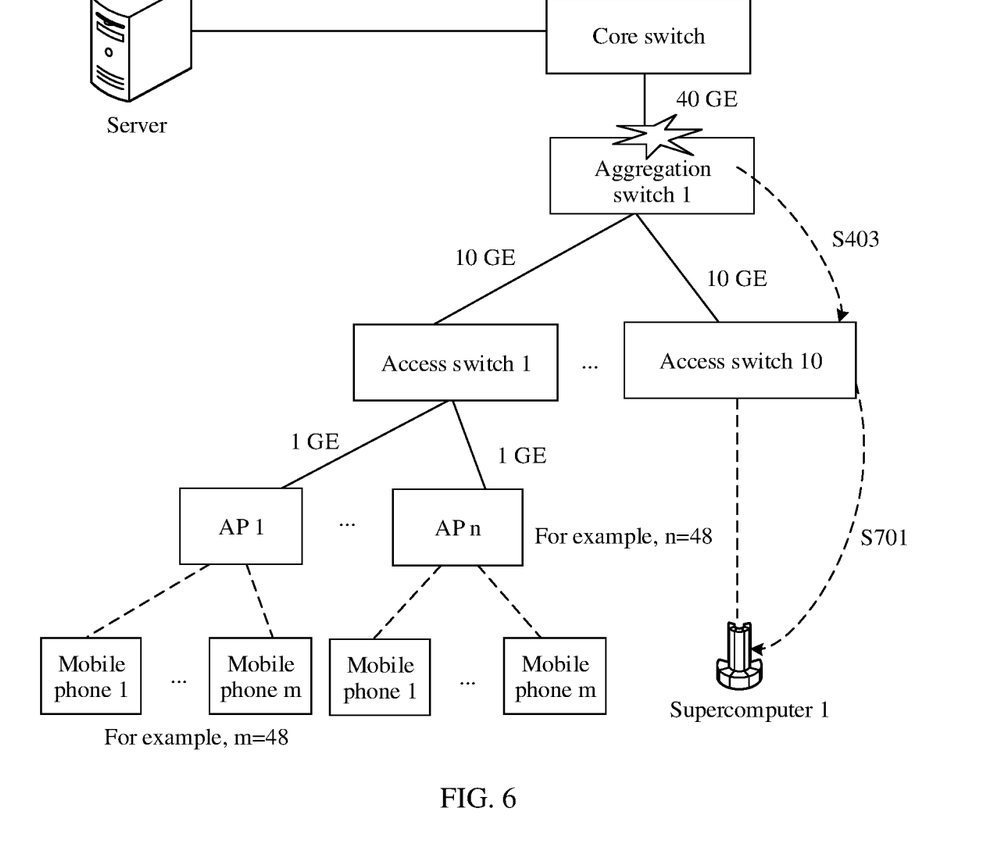
FIG. 6 is an example diagram of network congestion according to an embodiment of this application.
Figure 7:
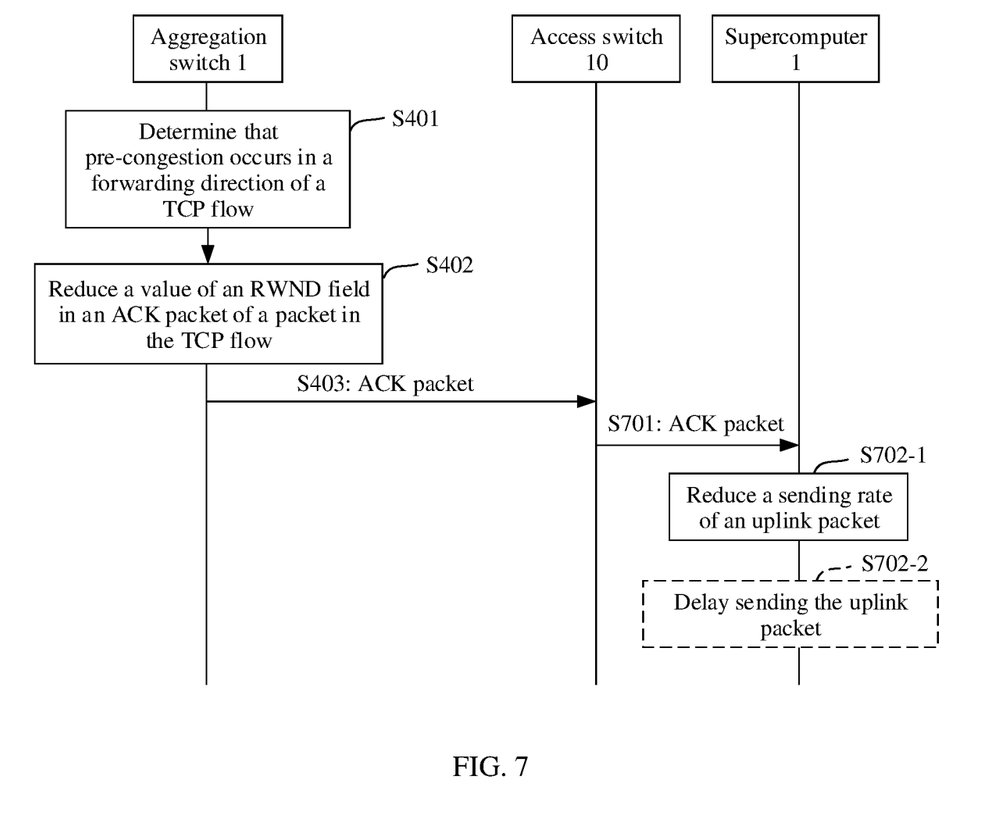
FIG. 7 is an interaction diagram of a network congestion control method according to an embodiment of this application.

As shown in FIG. 6, for example, the forwarding device is the aggregation switch 1, a transmit end at which a packet is congested is the supercomputer 1, and the supercomputer 1 is connected to the aggregation switch 1 by using the access switch 10. S403 may specifically include: The forwarding device (namely, the aggregation switch 1) forwards the ACK packet to the access switch 10. As shown in FIG. 7, after the access switch 10 receives the ACK packet forwarded by the aggregation switch 1, the network congestion control method provided in this embodiment of this application may further include the following Step S701 and S702-1 or S702-2.

S701: The access switch 10 forwards the ACK packet to the supercomputer 1.

The ACK packet forwarded by the access switch 10 to the supercomputer 1 is used to delay the supercomputer 1 from sending an uplink packet, or is used by the supercomputer 1 to reduce a sending rate of an uplink packet.

S702-1: The supercomputer 1 reduces the sending rate of the uplink packet.

For example, the supercomputer 1 may reduce the send window, to reduce the sending rate of the uplink packet. Alternatively, the supercomputer 1 may reduce the sending rate of the uplink packet in another manner. For details, refer to the conventional technology. This is not limited in this application.

S702-2: The supercomputer 1 delays sending the uplink packet.

For example, the supercomputer 1 may delay, for duration t, sending the uplink packet to the server. For example, t may be determined based on the value of the RWND field in the ACK packet. Alternatively, the supercomputer 1 may suspend sending the uplink packet to the server until receiving indication information for resuming the send window. This is not limited in this application.

Similarly, when the forwarding device is another device, for example, a core switch, an access switch, or an AP, refer to the foregoing process. In a case of the uplink ACK packet, also refer to the foregoing process. Details are not described herein again.

In this application, when congestion may occur in the forwarding direction of the TCP flow, the forwarding device reduces the value of the RWND field in the ACK packet, to reduce the sending rate of the transmit end for the packet in the TCP flow or delay sending of the packet by the transmit end. This relieves the buffer pressure of the forwarding device, reduces the packet loss, and improves continuity and completion of the packet in a transmission process of the TCP flow.

It should be understood that the solutions in embodiments of this application may be appropriately combined for use, and explanations or descriptions of terms in embodiments may be cross-referenced or explained in embodiments. This is not limited.

It should be further understood that sequence numbers of the foregoing processes do not mean an execution sequence in various embodiments of this application. The execution sequence of the processes should be determined based on functions and internal logic of the processes, and should not be construed as any limitation on implementation processes of embodiments of this application.

It may be understood that, to implement functions in any one of the foregoing embodiments, the forwarding device (for example, the core switch, the aggregation switch, the access switch, or the wireless access point AP) includes a corresponding hardware structure and/or software module for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the forwarding device (for example, the core switch, the aggregation switch, the access switch, or the wireless access point AP) may be divided into function modules. For example, each function module may be obtained through division based on each corresponding function, or two or more functions may be integrated into one processing module. The foregoing integrated module may be implemented in a form of hardware, or may be implemented in a form of a software function module. It should be noted that, in embodiments of this application, module division is an example, and is merely logical function division. In actual implementation, another division manner may be used.

Figure 8:
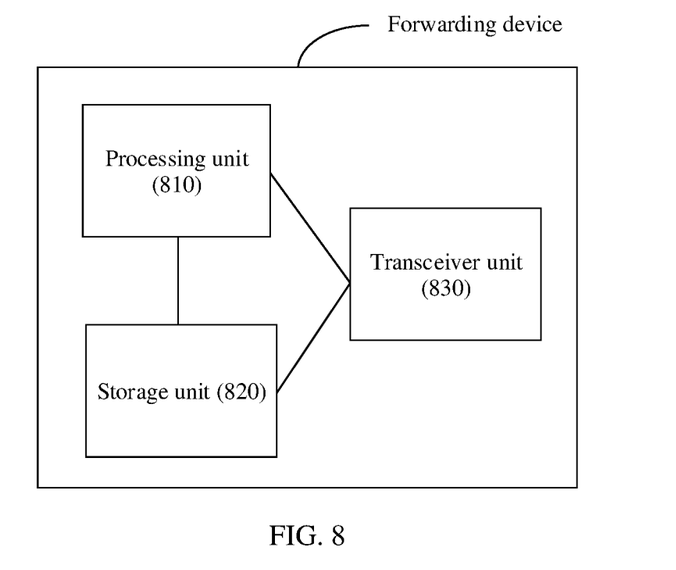
FIG. 8 is a block diagram of a structure of a forwarding device according to an embodiment of this application.

For example, when each function module is obtained through division in an integrated manner, FIG. 8 is a block diagram of a structure of a forwarding device according to an embodiment of this application. The forwarding device (for example, a core switch, an aggregation switch, an access switch, or a wireless access point AP) may include a processing unit 810, a storage unit 820, and a transceiver unit 830.

The processing unit 810 is configured to reduce a value of a receive window RWND field in an acknowledge ACK packet of a packet in a TCP flow when pre-congestion occurs in a forwarding direction of the TCP flow. The ACK packet is reverse to the TCP flow. The forwarding direction includes an uplink direction and a downlink direction, and/or, the processing unit 810 is used in another process of a technology described in this specification. The storage unit 820 is configured to store a computer program, and buffer the TCP flow, and/or other information used for the technology described in this specification. The transceiver unit 830 is configured to receive or send a radio signal, for example, forward a received TCP flow, and/or other information used for the technology described in this specification.

In some embodiments, the processing unit 810 is further configured to determine, based on a buffer status of the storage unit 820, that pre-congestion occurs in the forwarding direction of the TCP flow. The buffer status of the storage unit 820 depends on one or more of the following: a quantity of packets buffered in the storage unit 820, a data volume of the packets buffered in the storage unit 820, and a ratio of the data volume of the packets buffered in the storage unit 820 to a buffer area.

In some embodiments, when one or more of the following conditions are met, the processing unit 810 determines that pre-congestion occurs in the forwarding direction of the TCP flow: A quantity of packets buffered by the storage unit 820 in the forwarding direction of the TCP flow is greater than a preset quantity, a data volume of the packets buffered by the storage unit 820 in the forwarding direction of the TCP flow is greater than a preset data volume, and a ratio of the data volume of the packets buffered by the storage unit 820 in the forwarding direction of the TCP flow to the buffer area is greater than a preset ratio.

In some embodiments, the processing unit 810 may reduce the value of the RWND field in the ACK packet of the packet in the TCP flow according to the following formula: $RWND = RWND' \times (1 - \alpha/2)$, where $\alpha = (1-g) \times \alpha' + g \times F$, $RWND'$ is a current value of the RWND field of the forwarding device, $\alpha'$ is a current adjustable parameter, g is an adjustable parameter, and F is the quantity of the packets buffered in the forwarding direction of the TCP flow, the data volume of the packets, or the ratio of the data volume of the packets to the buffer area.

It should be noted that the transceiver unit 830 may include a radio frequency circuit. The forwarding device may receive or send a radio signal by using the radio frequency circuit. The radio frequency circuit usually includes but is not limited to an antenna, at least one amplifier, a transceiver, a coupler, a low noise amplifier, a duplexer, and the like. In addition, the radio frequency circuit may further communicate with another device through wireless communication. The wireless communication may use any communication standard or protocol, including but not limited to a global system for mobile communications, a general packet radio service, code division multiple access, wideband code division multiple access, long term evolution, an email, an SMS service, and the like.

In an optional manner, when data transmission is implemented by using software, data transmission may be implemented completely or partially in a form of a computer program product. The computer program product includes one or more computer instructions. When the computer program instructions are loaded and executed on a computer, the procedure or functions in embodiments of this application are all or partially implemented. The computer may be a general-purpose computer, a dedicated computer, a computer network, or another programmable apparatus. The computer instructions may be stored in a computer-readable storage medium, or transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, a solid state disk (SSD)), or the like.

Method or algorithm steps described with reference to embodiments of this application may be implemented by hardware, or may be implemented by a processor by executing software instructions. The software instructions may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other form well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a detection apparatus. Certainly, the processor and the storage medium may alternatively exist in a detection apparatus as discrete components.

Based on the descriptions of the foregoing implementations, it may be clearly understood by a person skilled in the art that, for ease and brevity of description, division of the foregoing function modules is merely used as an example for description. In actual application, the foregoing functions may be allocated to different function modules for implementation based on a requirement, that is, an internal structure of the apparatus is divided into different function modules, to implement all or some of the functions described above.

In an optional manner, this application provides a chip system. The chip system includes a processor and a memory. The memory stores computer program code. When the computer program code is executed by the processor, the method in any possible implementation provided in this application is implemented. The chip system may include a chip, or may include a chip and another discrete component.

In the several embodiments provided in this application, it should be understood that the disclosed apparatuses and methods may be implemented in other manners. For example, the described apparatus embodiment is merely an example. For example, division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed in a plurality of different places. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The foregoing integrated unit may be implemented in a form of hardware, or may be implemented in a form of a software functional unit.

When being implemented in the form of the software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium, and includes a plurality of instructions for instructing a device (which may be a single-chip microcomputer, a chip, or the like) or a processor to perform all or some of the steps of the method in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
    determining, by a forwarding device that forwards a Transmission Control Protocol (TCP) flow, based on a buffer status of the forwarding device, that pre-congestion occurs in a forwarding direction of the TCP flow, wherein the buffer status of the forwarding device depends on one or more of following: a quantity of packets buffered in the forwarding device, or a data volume of the packets buffered in the forwarding device, or a ratio of the data volume of the packets buffered in the forwarding device to a buffer area, and wherein it is determined that the pre-congestion occurs in the forwarding direction of the TCP flow when one or more of following are met:

a quantity of packets buffered in the forwarding device in the forwarding direction of the TCP flow is greater than a preset quantity; or a data volume of the packets buffered in the forwarding device in the forwarding direction of the TCP flow is greater than a preset data volume; or a ratio of the data volume of the packets buffered in the forwarding device in the forwarding direction of the TCP flow to the buffer area is greater than a preset ratio; and when the pre-congestion occurs in the forwarding direction of the TCP flow on the forwarding device that forwards the TCP flow, reducing, by the forwarding device, a value of a receive window (RWND) field in an acknowledge (ACK) packet of a packet in the TCP flow, and wherein:

the ACK packet acknowledges receipt of the packet and is in an opposite direction to the forwarding direction of the TCP flow; and the preset quantity or the preset data volume or the preset ratio is determined by the forwarding device based on a current throughput in the forwarding direction of the TCP flow and the quantity of packets buffered in the forwarding device or the data volume of the packets buffered in the forwarding device.

2. The method according to claim 1, wherein reducing, by the forwarding device, the value of the RWND field in the ACK packet of the packet in the TCP flow comprises:

reducing, by the forwarding device, the value of the RWND field in the ACK packet of the packet in the TCP flow based on one or more of following: the quantity of the packets buffered by the forwarding device in the forwarding direction of the TCP flow, the data volume of the packets buffered by the forwarding device in the forwarding direction of the TCP flow, or the ratio of the data volume of the packets buffered by the forwarding device in the forwarding direction of the TCP flow to the buffer area.

3. The method according to claim 1, wherein the forwarding direction comprises an uplink direction.

4. The method according to claim 1, wherein the forwarding device is a core switch.

5. The method according to claim 1, wherein the forwarding direction comprises a downlink direction.

6. The method according to claim 1, wherein the forwarding device is an aggregation switch.

7. The method according to claim 1, wherein the forwarding device is an access switch.

8. The method according to claim 1, wherein the forwarding device is a wireless access point.

9. A forwarding device comprising:
at least one processor, configured to:
determine, based on a buffer status of the forwarding device, that pre-congestion occurs in a forwarding direction of a Transmission Control Protocol (TCP) flow, wherein the forwarding device forwards the TCP flow, the buffer status of the forwarding device depends on one or more of following: a quantity of packets buffered in the forwarding device, or a data volume of the packets buffered in the forwarding device, or a ratio of the data volume of the packets buffered in the forwarding device to a buffer area, and wherein it is determined that the pre-congestion occurs in the forwarding direction of the TCP flow when one or more of following are met:

a quantity of packets buffered by the forwarding device in the forwarding direction of the TCP flow is greater than a preset quantity; or a data volume of the packets buffered by the forwarding device in the forwarding direction of the TCP flow is greater than a preset data volume; or a ratio of the data volume of the packets buffered by the forwarding device in the forwarding direction of the TCP flow to the buffer area is greater than a preset ratio; and reduce a value of a receive window (RWND) field in an acknowledge (ACK) packet of a packet in the TCP flow when the pre-congestion occurs in the forwarding direction of the TCP flow, and wherein:

the ACK packet acknowledges receipt of the packet and is in an opposite direction to the forwarding direction of the TCP flow; and the preset quantity or the preset data volume or the preset ratio is determined by the forwarding device based on a current throughput in the forwarding direction of the TCP flow and the quantity of packets buffered in the forwarding device or the data volume of the packets buffered in the forwarding device.

10. The forwarding device according to claim 9, wherein that the at least one processor reduces the value of the RWND field in the ACK packet of the packet in the TCP flow comprises:

the at least one processor reduces the value of the RWND field in the ACK packet of the packet in the TCP flow based on one or more of following: the quantity of the packets buffered by the forwarding device in the forwarding direction of the TCP flow, the data volume of the packets buffered by the forwarding device in the forwarding direction of the TCP flow, or the ratio of the data volume of the packets buffered by the forwarding device in the forwarding direction of the TCP flow to the buffer area.

11. The forwarding device according to claim 9, wherein the forwarding direction comprises an uplink direction.

12. The forwarding device according to claim 9, wherein the forwarding device is a core switch, an aggregation switch, an access switch, or a wireless access point.

13. The forwarding device according to claim 9, wherein the forwarding direction comprises a downlink direction.

14. The forwarding device according to claim 9, wherein it is determined that the pre-congestion occurs in the forwarding direction of the TCP flow when the quantity of packets buffered by the forwarding device in the forwarding direction of the TCP flow is greater than the preset quantity.

15. The forwarding device according to claim 9, wherein it is determined that the pre-congestion occurs in the forwarding direction of the TCP flow when the data volume of the packets buffered by the forwarding device in the forwarding direction of the TCP flow is greater than the preset data volume.

16. A forwarding device comprising:
a non-transitory memory, configured to store a computer program and a Transmission Control Protocol (TCP) flow;
a transceiver, configured to forward the TCP flow; and
a processor in communication with the memory and the transceiver, the processor being configured to execute the computer program to cause the forwarding device to perform:
determining, based on a buffer status of the forwarding device, that pre-congestion occurs in a forwarding direction of the TCP flow, wherein the buffer status of the forwarding device depends on one or more of following: a quantity of packets buffered in the forwarding device, or a data volume of the packets buffered in the forwarding device, or a ratio of the data volume of the packet buffered in the forwarding device to a buffer area, and wherein it is determined that the pre-congestion occurs in the forwarding direction of the TCP flow when one or more of following are met:
- a quantity of packets buffered by the forwarding device in the forwarding direction of the TCP flow is greater than a preset quantity; or
- a data volume of the packets buffered by the forwarding device in the forwarding direction of the TCP flow is greater than a preset data volume; or
- a ratio of the data volume of the packets buffered by the forwarding device in the forwarding direction of the TCP flow to the buffer area is greater than a preset ratio; and when the pre-congestion occurs in the forwarding direction of the TCP flow, reducing a value of a receive window (RWND) field in an acknowledge (ACK) packet of a packet in the TCP flow, wherein the ACK packet acknowledges receipt of the packet and is in an opposite direction to the forwarding direction of the TCP flow; and wherein the preset quantity or the preset data volume or the preset ratio is determined by the forwarding device based on a current throughput in the forwarding direction of the TCP flow and the quantity of packets buffered in the forwarding device or the data volume of the packets buffered in the forwarding device.

17. The forwarding device according to claim 16, wherein reducing the value of the RWND field in the ACK packet of the packet in the TCP flow comprises:
- reducing the value of the RWND field in the ACK packet of the packet in the TCP flow based on one or more of following: the quantity of the packets buffered by the forwarding device in the forwarding direction of the TCP flow, the data volume of the packets buffered by the forwarding device in the forwarding direction of the TCP flow, or the ratio of the data volume of the packets buffered by the forwarding device in the forwarding direction of the TCP flow to the buffer area.

18. The forwarding device according to claim 16, wherein the forwarding direction comprises an uplink direction.

19. The forwarding device according to claim 16, wherein the forwarding device is a core switch, an aggregation switch, an access switch, or a wireless access point.

20. The forwarding device according to claim 16, wherein the forwarding direction comprises a downlink direction.

* * * * *